United States Patent
Ni et al.

(10) Patent No.: US 7,433,724 B2
(45) Date of Patent: Oct. 7, 2008

(54) MOBILE PHONE WITH A FASTENER CAPABLE OF BIDIRECTION MOVEMENT

(75) Inventors: Ming-Hong Ni, Sanchong (TW); Hsin-Chi Wang, Jiadong Township, Pingtung County (TW)

(73) Assignee: Qisda Corporation, Taoyuan County (TW)

( * ) Notice: Subject to any disclaimer, the term of this patent is extended or adjusted under 35 U.S.C. 154(b) by 460 days.

(21) Appl. No.: 11/320,059

(22) Filed: Dec. 28, 2005

(65) Prior Publication Data

US 2006/0148538 A1    Jul. 6, 2006

(30) Foreign Application Priority Data

Dec. 31, 2004   (TW) .............................. 93141909 A

(51) Int. Cl.
*H04M 1/00* (2006.01)

(52) U.S. Cl. .................. 455/575.6; 455/575.2

(58) Field of Classification Search ............. 455/575.1, 455/575.2, 575.3, 575.4, 575.5, 575.6, 575.7, 455/575.8, 575.9

See application file for complete search history.

(56) References Cited

U.S. PATENT DOCUMENTS 5,548,824 A * 8/1996 Inubushi et al. .......... 455/575.1
6,094,566 A * 7/2000 Dasent et al. ............ 455/575.6

* cited by examiner

*Primary Examiner*—Nick Corsaro
*Assistant Examiner*—Vladimir Magloire

(57) ABSTRACT

A mobile phone comprises: a casing, a battery cover, a fastener, an elastic member and a ring. The casing has a receiving room and an opening connected to the receiving room. The battery cover is disposed on the casing removably. The fastener is movably disposed in the receiving room along a first direction and a second direction. The elastic member disposed in a bottom of the receiving room is against the fastener to provide a resilient force parallel to the first direction so as to couple the fastener and the battery cover. The ring is fastened on the casing via the opening. When the fastener is pressed, the fastener moves to the first direction to depart the battery cover from the casing. When the fastener is pushed, the fastener moves to the second direction to depart the ring from the casing.

10 Claims, 6 Drawing Sheets

MOBILE PHONE WITH A FASTENER CAPABLE OF BIDIRECTION MOVEMENT

This application claims the benefit of Taiwan application Serial No. 93141909, filed Dec. 31, 2004, the subject matter of which is incorporated herein by reference.

BACKGROUND OF THE INVENTION

1. Field of the Invention

The invention is related to a mobile phone and more particularly to a mobile phone with a detachable accessory and a detachable battery cover.

2. Description of the Related Art

In the modern society, many young people pursue the fashion and are attracted to the accessories for dressing up themselves, such as rings, earrings, nail polish, handbags or the accessory of a mobile phone, which express their distinguishing characteristic.

Exemplifying a mobile phone, many accessories are attached on it. On the one hand, users use ropes of the accessories to hang the mobile phone on the neck, handbags, backpacks, or even wear the girdles with the accessories to show their stylishness. On the other hand, the accessory of the mobile phone is convenient for the users to hang the mobile phone.

Many mobile phone accessories are fixed on the cover. However, it is inconvenient to the user for usage. Further, the mobile phone has a protruding point as a detach point between the mobile phone and the battery, and using a uniaxial direction mechanism is currently the only way to detach or to assemble the battery and the mobile phone. Besides, the SIM card is often disposed between the battery and the mobile phone so that replacing the SIM card is troublesome.

Moreover, due to the public security is bad, the robbery incidents for mobile phones and the handbags frequently occur. In many incidents, victims hang the mobile phone on their chest or on the handbags. The robbers rob the mobile phone by grabbing or by pulling apart the belt of the accessory. Under this circumstance, the victims often feel helpless.

SUMMARY OF THE INVENTION

It is therefore an object of the invention to provide a multifunctional mobile phone having a ring on which both of the battery and the mobile phone can be hung. Moreover, the mobile phone is burglarproof and easily for user to change the SIM card.

The invention achieves the above-identified object by providing a mobile phone. The mobile device comprises: a casing, a cover, a fastener, an elastic member and a ring. The casing has a receiving room and an opening being connected to each other. The cover, for example a battery cover, is disposed on the casing removably. The fastener is movably disposed in the receiving room along a first direction and a second direction. The elastic member disposed in a bottom of the receiving room is against the fastener to provide a resilient force parallel to the first direction so as to couple the fastener and the battery cover. The ring is fastened on the casing via the opening. When the fastener is pressed, the fastener moves to the first direction to depart the battery cover from the casing. When the fastener is pushed, the fastener moves to the second direction to depart the ring from the casing.

Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1A:
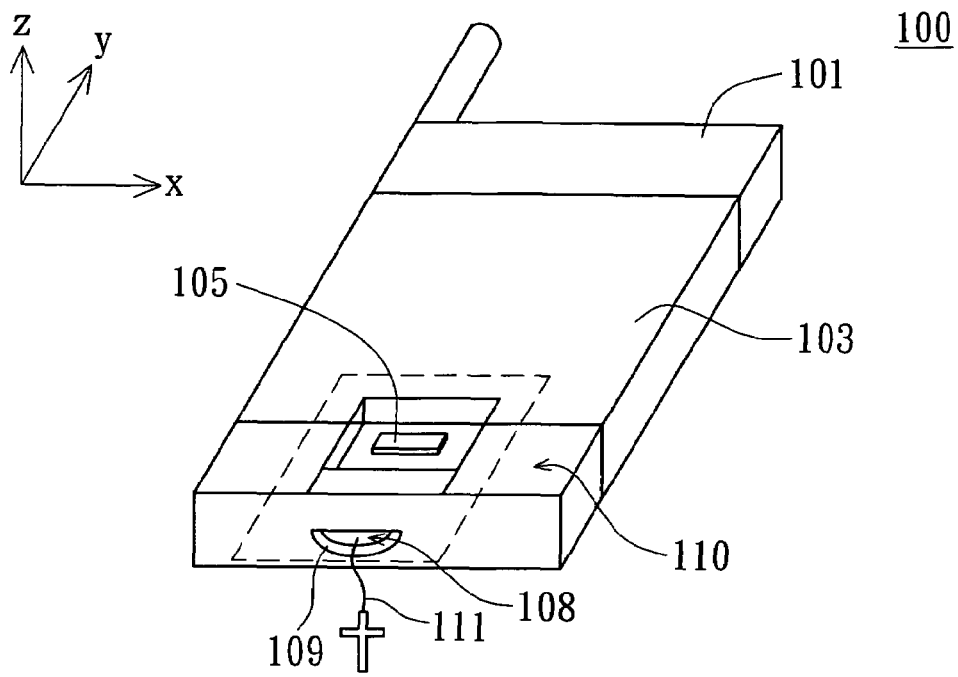
FIG. 1A is a rear perspective view of the mobile phone.
Figure 1B:
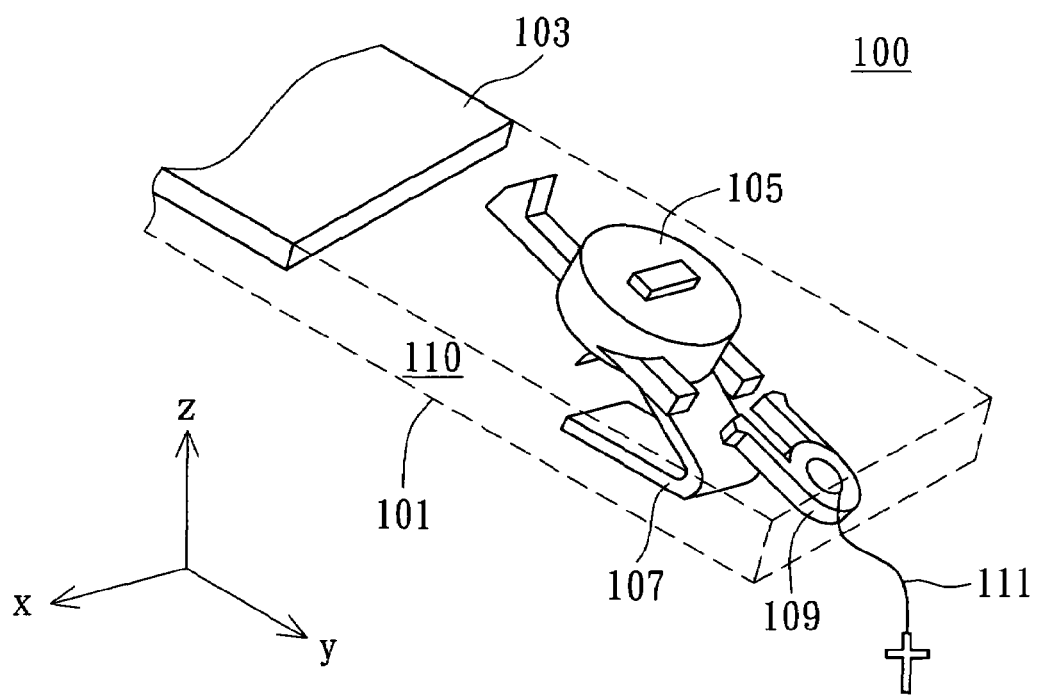
FIG. 1B is the exploded view of the mobile phone.

Referring both to FIG. 1A and FIG. 1B, FIG. 1A is a rear perspective view of the mobile phone and FIG. 1B is the exploded view of the mobile phone. The mobile phone 100 includes a casing 101, a battery cover 103, a fastener 105, an elastic member 107 and a ring 109. As shown in FIG. 1A, the ring 109 is capable of connecting to accessory 111. The accessory 111 is able to be hung on the neck or the handbags of the users. The casing 101 has a receiving room 110 and an opening 108, the fastener 105 is able to move along a first direction Z and a second direction Y in the receiving room 110, and the fastener 105 is coupled to the battery cover 103. In addition, the receiving room 110 is connected to the opening 108. The elastic member 107 is disposed in the receiving room and coupled to bottom of the fastener 105. The elastic member 107 is used to provide a resilient force to the fastener 105. The ring 109 is drawable from the casing 101.

Figure 1C:
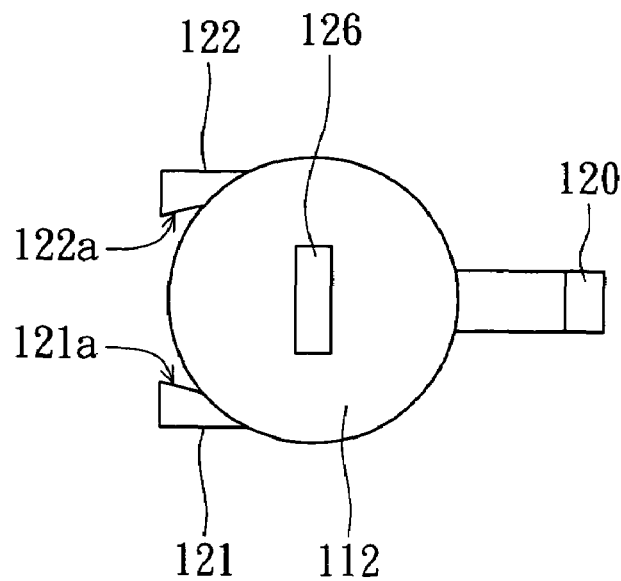
FIG. 1C is a top view of the fastener.

Referring to FIG. 1C, a top view of the fastener is shown. The fastener 105 includes a fastener body 112, a clasp 120, a first block 121, a second block 122 and a protruding point 126. The protruding point 126 is disposed on the top surface of the fastener 105. The clasp 120 is disposed on and extending from the fastener body 112 and used for clasping the battery cover 103.

The first block 121 and the second block 122 are disposed on and extending from the fastener body 112, and the outer side of the two blocks are substantially parallel to each other. The first block 121 and the second block 122 are used to depart the ring 109 from the casing 101. The first block 121 and the second block 122 include a first inclined plane 121a and a second inclined plane 122a respectively, and the protruding point 126 is used to provide a location for the users to apply force.

Figure 1D:
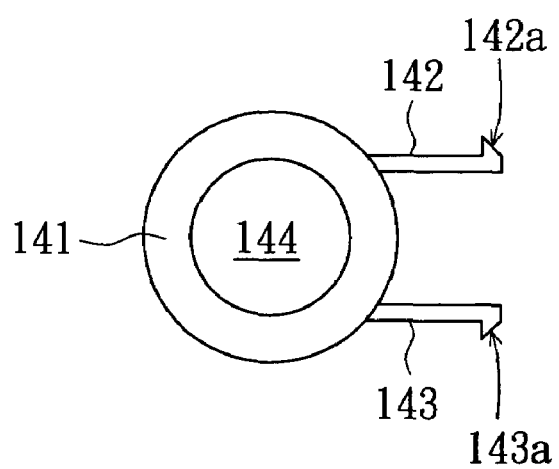
FIG. 1D is a top view of the ring according to a first embodiment of the invention.

Referring to FIG. 1D, a top view of the ring according to a first embodiment of the invention is shown. The ring 109 includes a ring body 141, a first hook 142 and a second hook 143. The ring body 141 has a hollow portion 144, through which the accessory (shown in FIG. 1A) is hung. The first hook 142 and the second hook 143 are both disposed on the ring body 141. When the fastener 105 and the ring body 141 are on the same plane, the first hook and the second hook are flexible to be pushed between the first block 121 and the second block 122 to contact the first block 121 and the second block 122.

Figure 2A:
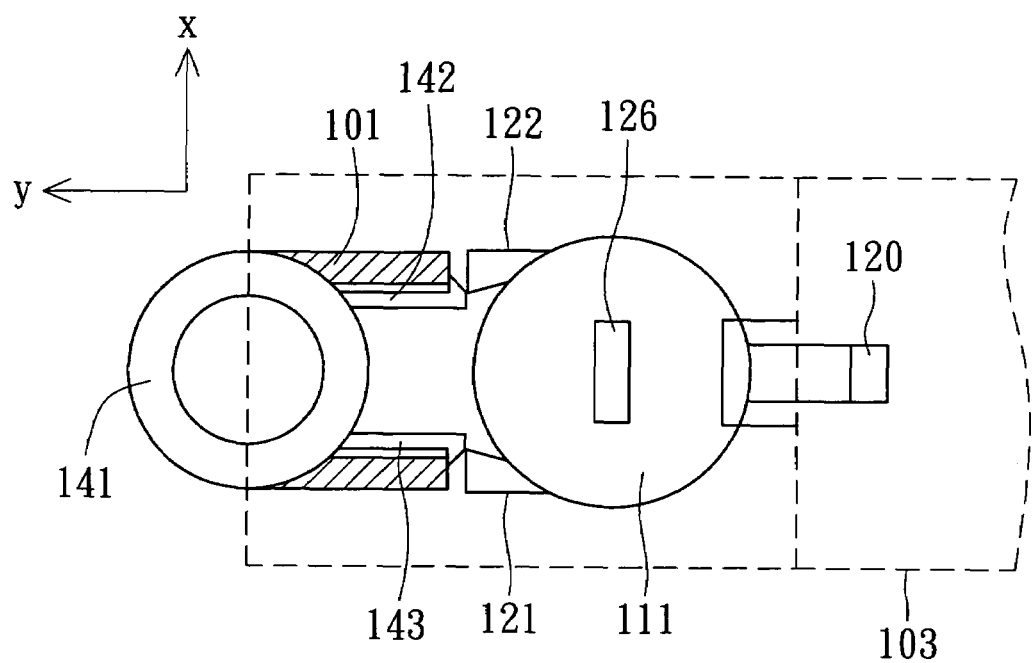
FIG. 2A is the top view of the fastener and the ring body on different planes.
Figure 2B:
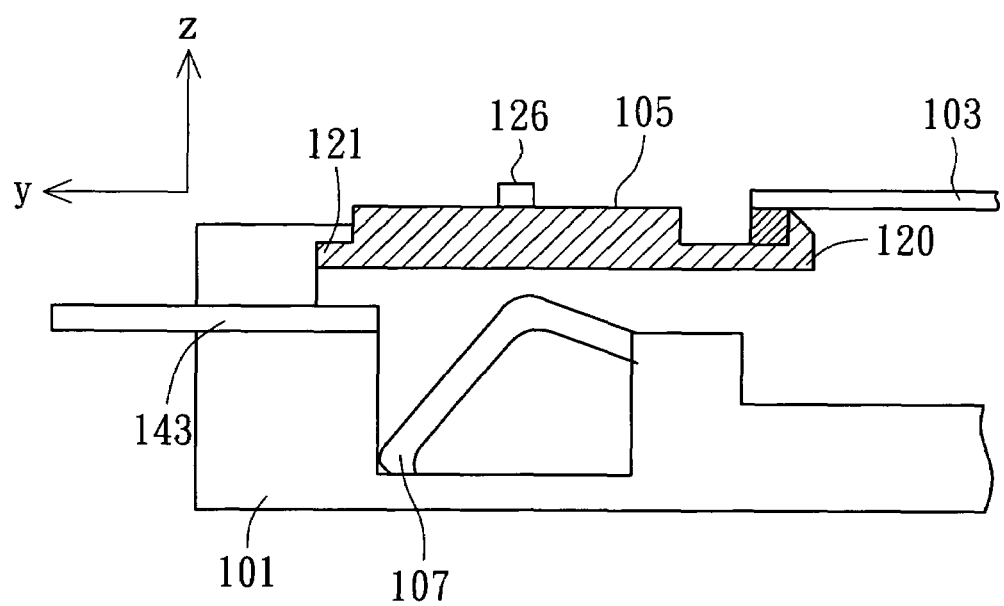
FIG. 2B is a cross-sectional view which illustrates the fastener and the ring body are on different planes.

Referring both to FIG. 2A and FIG. 2B, FIG. 2A is the top view of the fastener and the ring body on different planes, and FIG. 2B is a cross-sectional view of the fastener and the ring body, which are on different planes. When the protruding point 126 of the fastener 105 is not pressed, the ring 109 is fastened to the casing 101 (as the area with oblique lines shown in FIG. 2A) and the ring body 141 and the fastener 105 are not at the same plane. The fastener 105 is located on the elastic member 107. The clasp 120 of the fastener 105 clasps the battery cover 103. The first block 121 and the second block 122 of the fastener 105 are fastened to the casing 101.

Figure 2C:
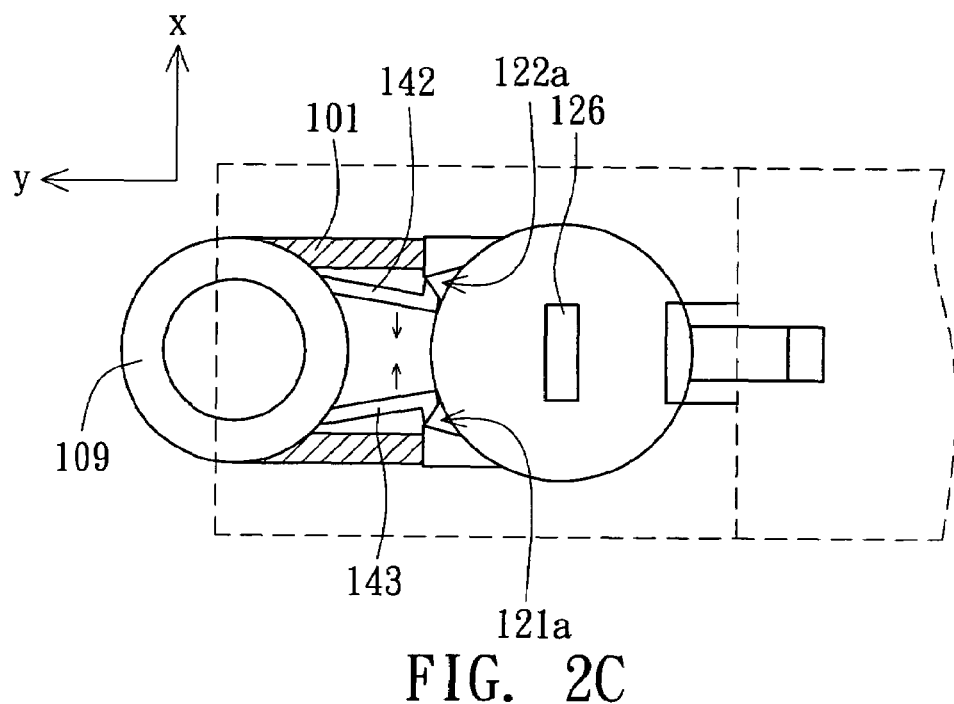
FIG. 2C is the top view of the fastener and the ring body on the same plane.
Figure 2D:
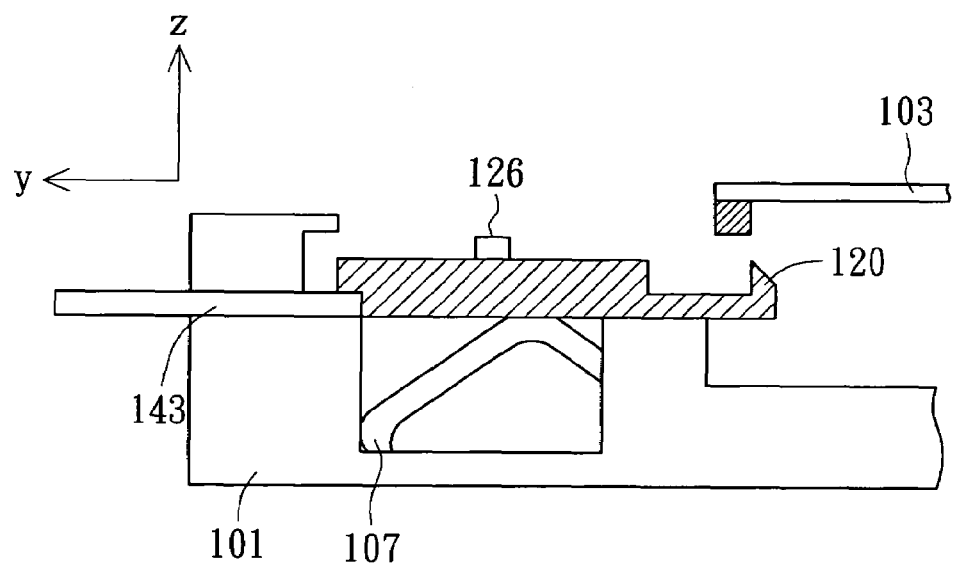
FIG. 2D is the cross-sectional view which illustrates the fastener and the ring body are on the same plane.

Referring to FIG. 2A, FIG. 2B, FIG. 2C and FIG. 2D, FIG. 2C is the top view of the fastener and the ring body on the same plane and FIG. 2D is the cross-sectional view which illustrates the fastener and the ring body are on the same plane. As shown in FIG. 2A, when a user presses the protruding point 126 along a first direction (z direction in FIG. 2D), the fastener 105 moves along the first direction (z direction), so that the elastic member 107 is pressed along the first direction (z direction) too. Thus, user can depart the battery cover 103 from the casing 101 and the fastener 105. As shown in FIGS. 2C and 2D, when the user presses the protruding point 126, the fastener 105 moves downward to the same plane with the ring body 141 substantially, the user then pushes the protruding point to move toward the second direction (y direction). The inclined plane 142a of the first hook 142 contacts the inclined plane 121a of the first block 121, and the inclined plane 143a of the second hook 143 contacts the inclined plane 122a of the second block. Due to the consistency force applying toward the second direction (y direction) on the fastener 105, the side surface of the first block 121 and the second block 122 are against the casing 101. The first block 121 and the second block 122 then press the first hook 142 and the second hook 143. Because of the flexibility of the first hook 142 and the second hook 143, the first hook 142 and the second hook 143 move to the third direction (x direction). The ring 109 moves to the third direction thereon. The ring 109 then departs the casing 101 accordingly.

Second Embodiment

Figure 3A:
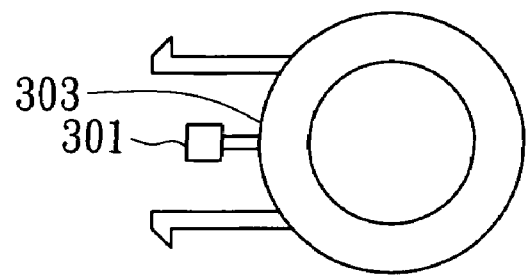
FIG. 3A is a top view of the ring having a foil according to a second embodiment of the invention.
Figure 3B:
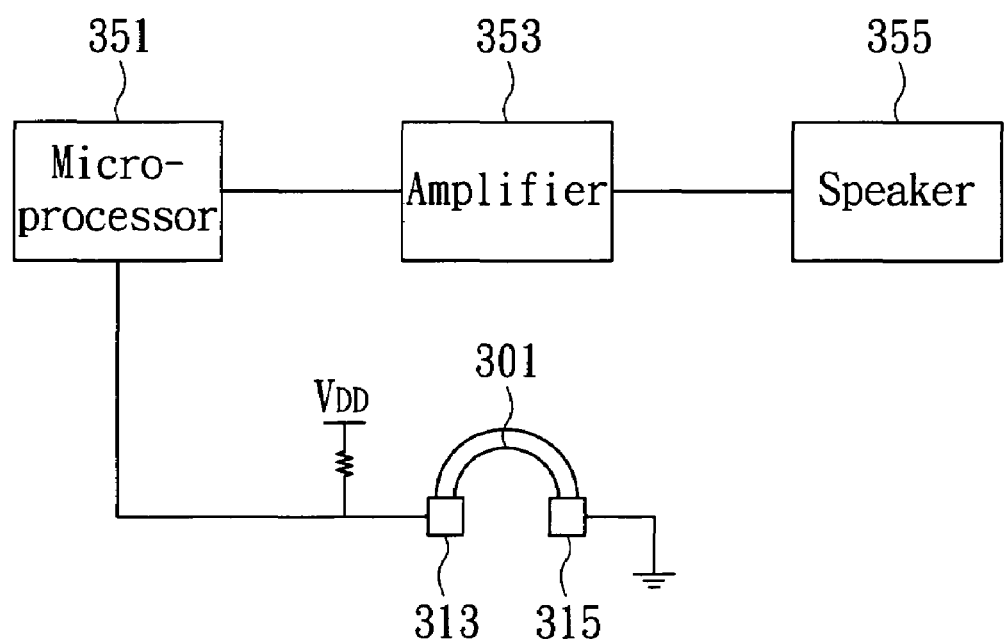
FIG. 3B is the block diagram of the foil and the mobile phone.

Referring both to FIG. 3A and FIG. 3B, FIG. 3A is a top view of the ring having a foil according to a second embodiment of the invention and FIG. 3B is the block diagram of the foil and the mobile phone. Compared with the first embodiment, the second embodiment further includes a foil 301, the foil 301 is disposed on the ring 309 via a neck 303. The foil 301 is a metal sheet with elasticity. The foil 301 is electrically connected to the microprocessor 351 of the casing. The casing includes a circuit board having a microprocessor 351, an amplifier 353 and a speaker 355. The foil 301 is electrically connected to the metal pad 313 and 315 which are located in the printed circuit board of the casing. One end of the foil 301 is connected to the printed circuit board while the other end thereof is grounding. When there is a robber attempt to rob the mobile phone, the victim would frequently grasp the accessory which may depart the mobile phone. Meanwhile, the foil 301 departs from the microprocessor 351 to form an open circuit. Thus, one end of the microprocessor conducts to the high voltage (VDD) side. The microprocessor 351 then measures the voltage variation. After calculation, the output signal is then outputted to the amplifier 353 and makes the speaker 355 whistle. The whistle can scare the robber and draw people's attention to help the victim.

Third Embodiment

Figure 4:
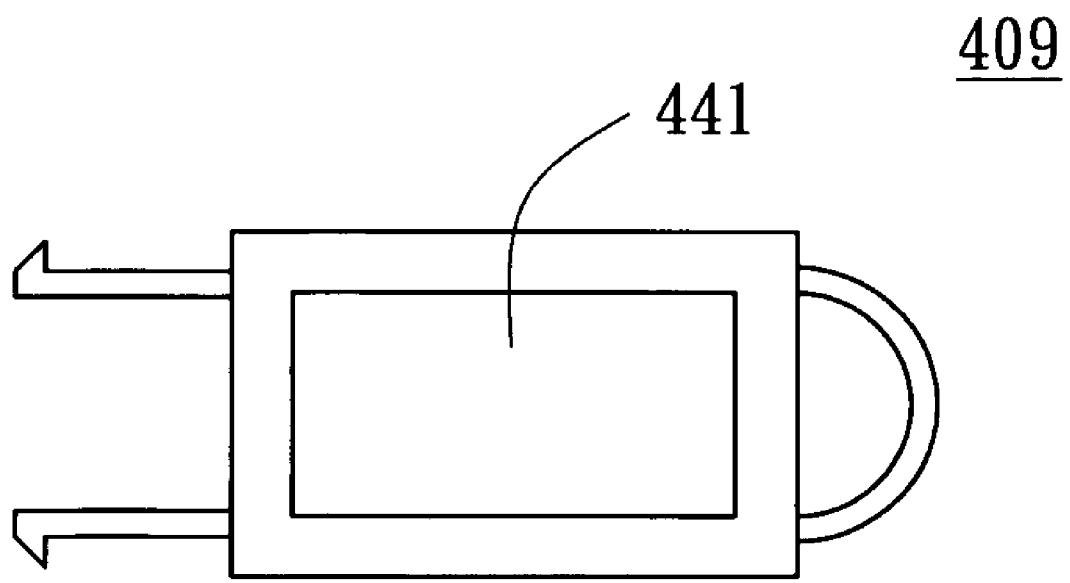
FIG. 4 shows a top view of the ring according to a third embodiment of the invention.

Referring to FIG. 4, a top view of the ring according to the third embodiment of the invention is shown. Compared with the first embodiment and the second embodiment, the shape of the third embodiment can be changed as FIG. 4. The ring 409 further comprises a ring body 441 in rectangular shape for placing a SIM card or a memory card. Accompanying the ring 409 and the mechanism disclosed in the first embodiment, the user can directly replace the memory card or the SIM card without taking out the battery cover or the battery. When a user would like to replace a SIM card or a memory card, the user only need to push the ring 409 and place the memory card into the ring body 441.

The mobile phone according to the above embodiments has the fastener that can move bi-directionally. By pressing the fastener, the battery cover departs the casing. By pressing and pushing the fastener, the ring departs from the casing. In comparison with the traditional mobile phone, the multifunctional mobile phone disclosed in the above embodiments provides bi-directional movements rather than on direction so as to easily remove the battery cover and the ring from the casing. Further, the fastener provides the mobile phone with a burglarproof function and added values for users to hang SIM card or memory card on the ring of the mobile phone.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mobile device, comprising:
    a casing, having a receiving room and an opening, the opening being connected to the receiving room;
    a cover, disposed on the casing removably;
    a fastener, movably disposed in the receiving room along a first direction and a second direction;
    an elastic member, disposed in a bottom of the receiving room, the elastic member being against the fastener and providing a resilient force parallel to the first direction so as to couple the fastener and the cover; and
    a ring, fastened on the casing via the opening;
    wherein when the fastener is pressed, the fastener moves to the first direction to depart the cover from the casing;
    wherein when the fastener is pushed, the fastener moves to the second direction to depart the ring from the casing.

2. The mobile device according to claim 1, wherein the fastener has a protruding point disposed on a top surface thereof for allowing a user to apply force.

3. The mobile device according to claim 1, wherein the fastener comprises:
    a fastener body;
    a clasp, disposed on and extending from the fastener body, for clasping the cover; and
    a first block and a second block, both disposed on and extending from the fastener body and substantially parallel to each other, wherein when the fastener approaches the ring, the first block and the second block pushes the ring to depart the ring from the casing.

4. The mobile device according to claim 3, wherein the ring comprises:
  a ring body, having a hollow portion through which an accessory is hung; and
  a first hook and a second hook, disposed on the ring body and flexible to be pushed between the first block and the second block, wherein when the fastener and the ring body are at the same plane, and the fastener approaches the ring of the mobile device, the first hook and the second hook pushes the fastener to depart the ring from the casing.

5. The mobile device according to claim 4, wherein the first hook and the second hook have a first inclined plane and a second inclined plane respectively, when the fastener approaches the ring of the mobile device, the first block and the second block are against the first inclined plane and the second inclined plane so as to push the first block and the second block to move along the third direction until the ring departs from the casing.

6. The mobile device according to claim 1, wherein the mobile device is a mobile phone and the ring further comprises a foil, the mobile phone further comprises a printed circuit board having a microprocessor, and wherein when the ring is connected to the mobile phone, one end of the foil is electrically connected to the microprocessor.

7. The mobile device according to claim 6, wherein the foil is an elastic piece.

8. The mobile device according to claim 6, wherein the ring body further comprises a receiving room to receive a SIM card, which is electrically connected to the microprocessor.

9. The mobile device according to claim 6, wherein the ring body further comprises a receiving room to receive a memory card, which is electrically connected to the microprocessor.

10. The mobile device according to claim 6, wherein the printed circuit board further comprises:
  an amplifier, connected to the microprocessor;
  a speaker, connected to the amplifier; and
  a resistor electrically connected to a high voltage end;
  wherein one end of the foil is connected to the microprocessor and the resistor while the other end of the resistor is connected to a low voltage end, and wherein when the foil is removed, the microprocessor detects the voltage variation and output a signal to the amplifier to make the speaker whistle.

* * * * *